United States Patent [19]
Wald

[11] Patent Number: 5,457,937
[45] Date of Patent: Oct. 17, 1995

[54] APPARATUS FOR WELDING HEAT-SEALABLE PACKAGING FILMS

[75] Inventor: Ulrich Wald, Hassloch, Germany

[73] Assignee: Paper Converting Machine GmbH, Schifferstadt, Germany

[21] Appl. No.: 210,982

[22] Filed: Mar. 21, 1994

[30] Foreign Application Priority Data

Mar. 23, 1993 [DE] Germany ............................ 9304300 U

[51] Int. Cl.$^6$ ............................. B65B 51/10; B65B 51/32
[52] U.S. Cl. ...................... 53/371.2; 156/515; 219/243
[58] Field of Search ................... 53/371.2, 373.7, 53/375.9, 552; 156/515, 530, 583.1, 583.2, 583.7, 583.9; 219/221, 243, 544, 546

[56] References Cited

U.S. PATENT DOCUMENTS

| | | | |
|---|---|---|---|
| 2,961,031 | 11/1960 | Ferner | 219/243 |
| 3,982,991 | 9/1976 | Hamm et al. | 156/515 |
| 4,108,712 | 8/1978 | Bala et al. | 156/583.2 |
| 4,834,830 | 5/1989 | Healer et al. | 53/375.9 |
| 5,149,943 | 9/1992 | Kupcikevicius | 156/583.2 |

Primary Examiner—Lowell A. Larson
Assistant Examiner—Rodney A. Butler
Attorney, Agent, or Firm—Panitch Schwarze Jacobs & Nadel

[57] ABSTRACT

Heat-sealable packaging films, particularly plastic bags, are hot pressure welded with an apparatus having at least one, and often two welding terminals, each having an electrically heated welding wire stretched thereacross. The welding terminal preferably has an elastic silicone backing which is protected from the welding wire by a covering material in the form of a sheath which surrounds the welding wire. The sheath is preferably made of plastic, such as polytetrafluoroethylene, which surrounds the welding wire with a minimum of play. When the sheath is formed from a sheet with overlapping edges, the area of overlap runs longitudinally with the wire and is arranged on the welding terminal such that it faces away from the packaging film being welded.

6 Claims, 2 Drawing Sheets 5,457,937

APPARATUS FOR WELDING HEAT-SEALABLE PACKAGING FILMS

FIELD OF THE INVENTION

The invention is based on an apparatus for the welding of heat-sealable packaging films, and particularly, for the hot pressure welding of plastic bags, with one or two welding terminals that move against each other, whereby on at least one of the welding terminals there is a welding wire that has a covering on the side directed towards the film.

BACKGROUND OF THE INVENTION

In the case of known welding apparatuses of that type, the welding wire requires a covering so that it does not stick to the plastic film that is to be bonded. Usually, the welding wire is not placed directly on the welding terminal, but is instead placed on an elastic silicone backing. In this case, an additional plastic layer for the protection of the silicone backing is needed between the backing and the welding wire. Both this intermediate layer and the outer covering mentioned above consist of narrow plastic bands, each of which must be fastened individually on the welding terminal.

Because of the high mechanical and thermal loading of the plastic layers mentioned, they undergo extremely severe wear and must be replaced several times each month, and in severe cases, as much as once per work shift.

SUMMARY OF THE INVENTION

Beginning at this point, the present invention achieves the object of improving the welding apparatus described with regard to the replacement of the plastic layers, and to configure the apparatus so that it is generally more user-friendly. This object is achieved in a surprisingly simple, yet not obvious way, in that a sheath that surrounds the welding wire is used in place of the previous band-shaped covering and intermediate layer.

This first yields the advantage that the separate plastic layers used previously are replaced by a single element and that, as a result, only this one element has to be fastened on the welding terminal. Another important simplification results by virtue of the fact that the welding wire acts as a guide for the plastic sheath, so that the aligning of the plastic layers that used to be necessary is now dispensed with, and a better grip is provided during the associated welding operations as well. Last but not least, there is also improved protection of the film that is to be bonded, as well as of the silicone backing that runs underneath the welding wire, since the sheath in accordance with the invention surrounds the welding wire on all sides and not just on its flat sides.

It is particularly expedient if the sheath is not adhered to the welding wire, which has usually been the case with the plastic layers up to now, but is instead fastened to the welding wire or the welding terminal at one end outside of the working width of the welding wire.

It is preferable if plastic is used as the material for the sheath, and polytetrafluoroethylene (available under the trademark TEFLON®) in particular. In doing this, it makes no difference if the welding wire is not placed directly on the welding terminal, as has been done in the past, but on a plastic insert instead.

BRIEF DESCRIPTION OF THE DRAWINGS

The foregoing summary, as well as the following detailed description of a preferred embodiment of the invention, will be better understood when read in conjunction with the appended drawings, where like numerals indicate like elements throughout the several views. For the purpose of illustrating the invention, there is shown in the drawings an embodiment which is presently preferred. It should be understood, however, that the invention is not limited to the precise arrangements and instrumentalities shown. In the drawings.

DETAILED DESCRIPTION OF PREFERRED EMBODIMENT

Figure 1:
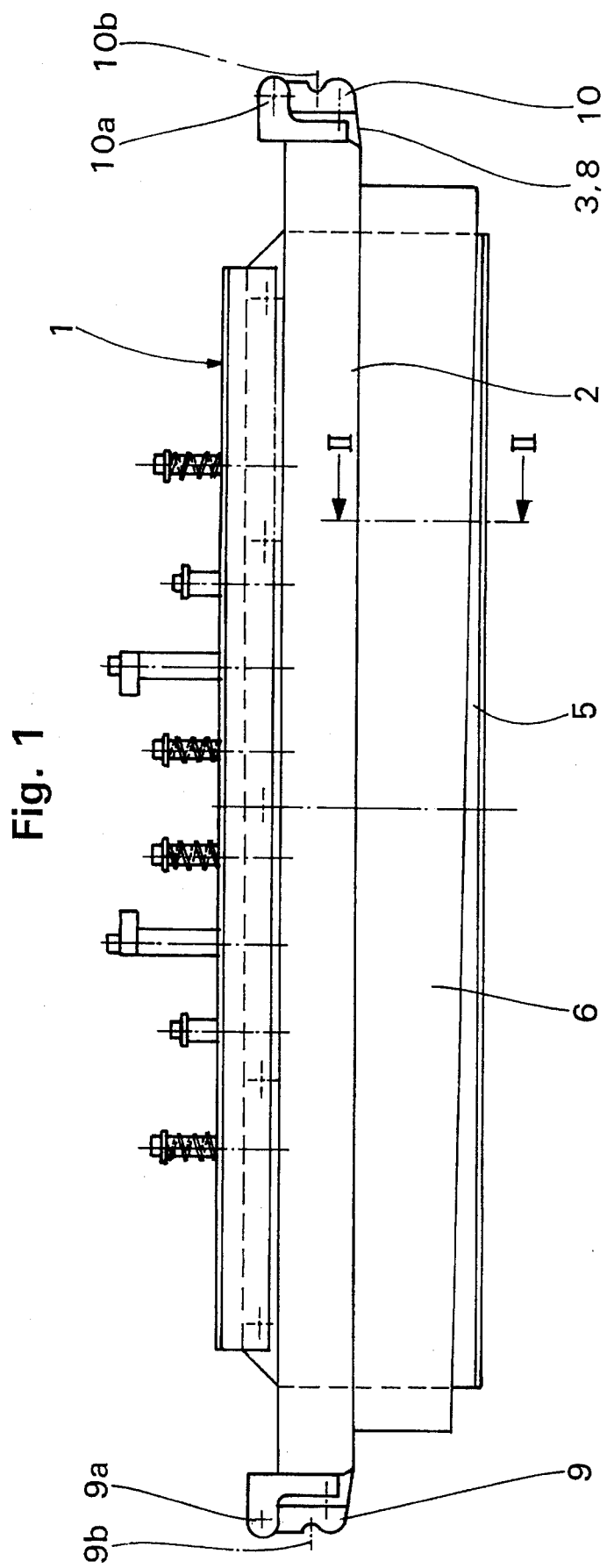
FIG. 1 is a partially broken away side view of the welding terminal according to the invention.

In FIG. 1, one can see a conventional welding terminal 1, which extends over the width of the packaging film to be bonded and projects somewhat beyond this on both sides. It comprises the actual welding bar 2, which carries on its other side, which faces the welding terminal (as shown in FIG. 2), a welding wire 3, usually made of copper; two clamping jaws 4 and 5 that are spring-mounted to the welding bar 2 in the clamping direction; and a blade 6 that runs in the space between the two clamping jaws.

Figure 2:
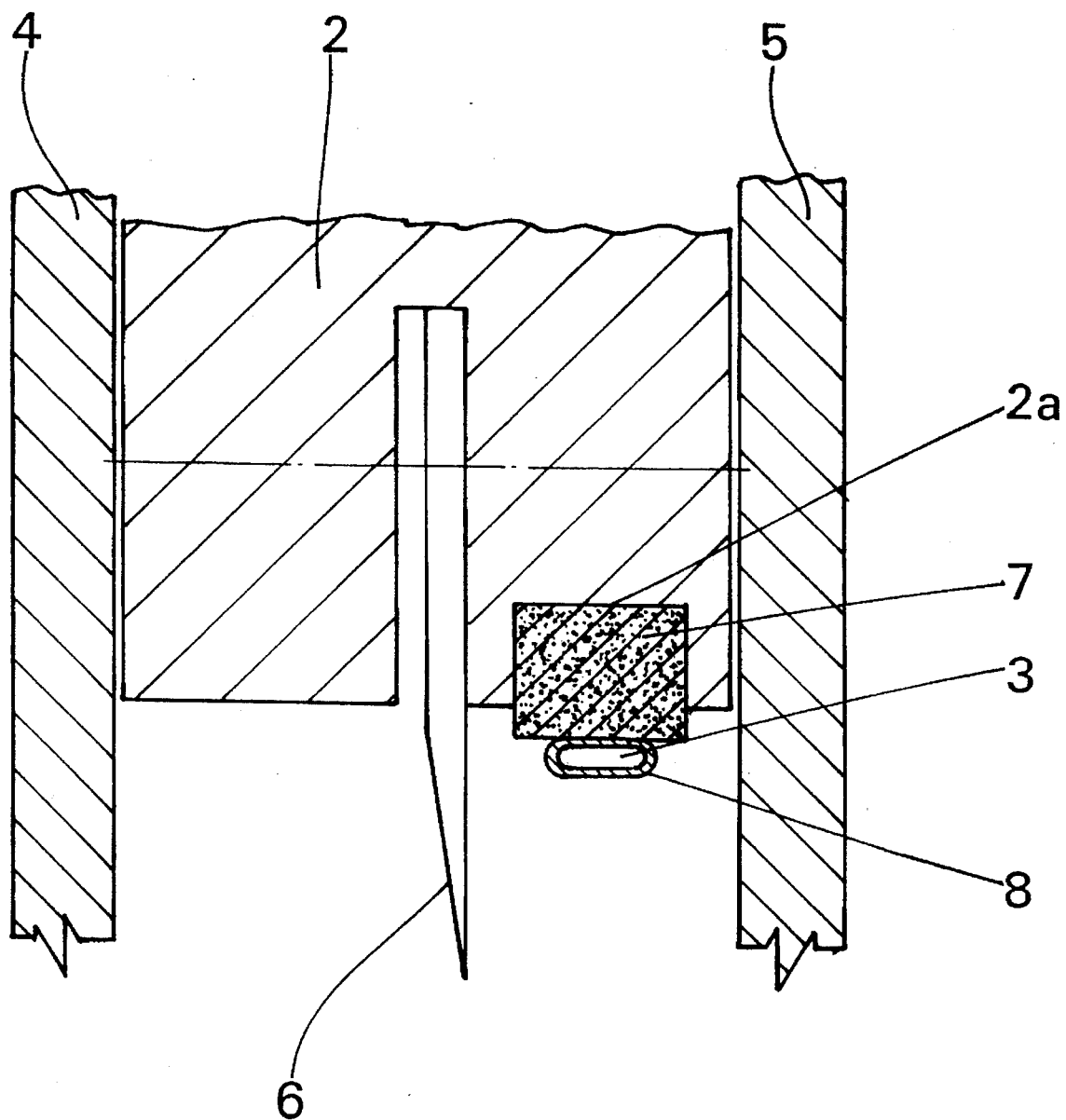
FIG. 2 is an enlarged cross-section along the line II—II in FIG. 1.

FIG. 2 shows the arrangement and the mounting of the welding wire 3 in relation to the welding bar 2. In this arrangement an elastic silicon backing 7 is placed in a channel 2a in the welding bar, which backing acts as tolerance compensation and a damping element for the welding wire 3.

It is now fundamental that the welding wire 3 that is stretched across the silicon backing 7 is covered by a TEFLON® sheath 8 in form of a hose. For this purpose the sheath is so dimensioned that it surrounds the welding wire almost completely free of folds and with a minimum of play. In this way, the sheath can be drawn into place easily, without a danger that the quality of the bonded seam could be negatively influenced by localized folding. It is expedient if the sheath is manufactured by folding a narrow plastic band in such a way that its edges overlap over almost half of its circumference and are bonded together there. The sheath is placed in such a way that the area of the overlap rests on the silicon backing. When this is done, the lost heat that is transmitted from the welding wire to the silicone backing and likewise to the welding bar is decreased, and the heat energy that is available for the welding process is increased correspondingly.

The welding wire and the TEFLON® sheath both extend over the entire length of the welding bar 2. The fastening of the wire to the welding bar is carried out by means of clamping devices 9 and 10 that are pivotably mounted at points 9a and 10a at the ends of the welding bar 2, and to which the welding wire is led from the welding surface and clamped at 9b and 10b. The sheath 8 ends at the left end of the welding terminal just before it reaches the clamping apparatus, whereas at the right end it continues and is clamped together with the welding wire at 10b.

By means of springs (indicated by dotted lines), the clamping devices 9 and 10 are pressed toward the outside, and thus hold the welding wire under tension. At the same time, the sheath 8 is also held by this tension securely against the welding bar.

In practice, the welding bar shown usually works in conjunction with a similar, opposing welding bar, which can carry a welding wire in the same way. Since this state of affairs is known in and of itself, the representation of this opposing terminal was dispensed with.

It will be appreciated by those skilled in the art from this disclosure that changes could be made to the embodiment described above without departing from the broad inventive concept thereof. It is understood, therefore, that this invention is not limited to the particular embodiment disclosed, but it is intended to cover modifications within the spirit and scope of the present invention as defined by the appended claims.

I claim:

1. Apparatus for the welding of heat-sealable packaging films, particularly for the hot pressure welding of plastic bags, comprising at least one movable welding terminal (1) having an electrically heated welding wire mounted thereon, said welding wire having a covering in the form of a sheath (8) that surrounds the welding wire (3), said sheath comprising a replaceable hose which can be easily drawn into place on the wire, the wire being mounted on the terminal by tensioning means and the sheath (8) being fastened to the welding terminal (1) by tensioning of the welding wire (3) across the welding terminal (1).

2. Apparatus in accordance with claim 1, wherein the sheath (8) is made of plastic.

3. Apparatus in accordance with claim 1, wherein the welding wire (3) with its sheath (8) is positioned on a plastic insert (7) in the welding terminal (1).

4. Apparatus in accordance with claim 1, wherein the sheath (8) surrounds the welding wire (3) with a minimum of play.

5. Apparatus in accordance with claim 1, wherein the sheath (8) is formed of a sheet having an area of overlap that runs longitudinally with the wire, and the area of overlap of the sheath is mounted on the welding terminal such that it faces away from a packaging film to be welded.

6. Apparatus in accordance with claim 2 wherein said plastic is polytetrafluoroethylene.

* * * * *